United States Patent [19]
Saito et al.

[11] Patent Number: 5,872,812
[45] Date of Patent: Feb. 16, 1999

[54] CARRIER REPRODUCING CIRCUIT INCLUDING REGION DECIDING CIRCUITRY

[75] Inventors: Naoyuki Saito; Takanori Iwamatsu, both of Kawasaki, Japan

[73] Assignee: Fujitsu Limited, Kanagawa, Japan

[21] Appl. No.: 697,966

[22] Filed: Sep. 5, 1996

[30] Foreign Application Priority Data

Jan. 30, 1996 [JP] Japan ................................ 8-013736

[51] Int. Cl.⁶ ............................... H04L 5/12; H04L 23/02
[52] U.S. Cl. ..................... 375/261; 375/326; 375/327; 375/328; 375/344; 331/12; 329/304
[58] Field of Search ..................... 375/326, 344, 375/327, 340, 354, 371, 376, 261, 264, 328; 331/12, 11, 17; 329/308, 309, 304

[56] References Cited

U.S. PATENT DOCUMENTS

| | | | |
|---|---|---|---|
| 5,519,733 | 5/1996 | Huang | 375/326 |
| 5,594,389 | 1/1997 | Kiyanagi et al. | 375/326 |
| 5,594,759 | 1/1997 | Iwamatsu | 375/326 |
| 5,596,605 | 1/1997 | Kiyanagi et al. | 375/326 |

FOREIGN PATENT DOCUMENTS 423649  1/1992  Japan.

*Primary Examiner*—Don N. Vo
*Attorney, Agent, or Firm*—Helfgott & Karas, P.C.

[57] ABSTRACT

A carrier reproducing circuit for detecting a phase error when an inputted baseband signal is out of phase and bringing the baseband signal into phase even in QAM systems in which normal signal points are located in a non-square pattern in a phase-amplitude signal space. When the baseband signal is out of phase, a first region decision circuit detects a presence of the baseband signal in a first region and outputs a first signal, and a second region decision circuit detects a presence of the baseband signal in a second region and outputs a second signal. If the second signal is not outputted over a predetermined period of time around the time at which the first signal is outputted, then a selective outputting circuit outputs a phase error detected by a phase error decision circuit with respect to the baseband signal at the time the first signal is outputted, to a control signal generator. If the second signal is outputted in the predetermined period of time, then the selective outputting circuit outputs the phase error detected by the phase error decision circuit with respect to the baseband signal at the time the first signal is outputted in a preceding cycle to the control signal generator.

4 Claims, 22 Drawing Sheets

| EFFECTIVE REGION DECISION CIRCUIT OUTPUT | CONTINUOUS-TIME EXTERNAL REGION DECISION CIRCUIT OUTPUT | IDENTIFYING CIRCUIT OUTPUT |
|---|---|---|
| 1 | 0 | 0 |
|  | 1 | 1 |
| 0 | 0,1 | 0 |

FIG. 7

| IDENTIFYING CIRCUIT OUTPUT | SELECTING CIRCUIT OUTPUT |
|---|---|
| 1 | PHASE ERROR DECISION CIRCUIT OUTPUT IS MADE EFFECTIVE |
| 0 | PRECEDING PHASE ERROR DECISION CIRCUIT OUTPUT IS HELD |

FIG. 8

| MEMORY DECISION | 2-BIT ERROR DECISION OUTPUT |
|---|---|
| IN REGION + REGION | 10 |
| IN REGION − REGION | 01 |
| OUTSIDE REGION | PRECEDING DECISION IS HELD |

CARRIER REPRODUCING CIRCUIT INCLUDING REGION DECIDING CIRCUITRY

BACKGROUND OF THE INVENTION

(1). Field of the Invention

The present invention relates to a carrier reproducing circuit, and more particularly to a carrier reproducing circuit for a multi-valued quadrature amplitude modulation system in which normal signal points are located in a non-square pattern in a phase-amplitude signal space known as a constellation plot.

QAM (Quadrature Amplitude Modulation) systems in which normal signal points are located in a square pattern in a phase-amplitude signal space include 4PSK, 16QAM, 64QAM, and 256QAM systems, whereas QAM systems in which normal signal points are located in a non-square pattern in a phase-amplitude signal space include 32QAM, 128QAM, and 512QAM systems.

(2). Description of the Related Art

One conventional carrier reproducing circuit for a QAM system in which normal signal points are located in a square pattern in a phase-amplitude signal space or a constellation plot has been proposed in Japanese patent application No. 7-60713 filed by the applicant of the present application. According to the proposed conventional carrier reproducing circuit, four regions are established respectively around four signal points at the four corners of the square pattern in the phase-amplitude signal space. When a baseband signal is out of phase, a phase error is determined from positions where the baseband signal was present, and the baseband signal is synchronized or brought into phase based on the determined phase error. Details of the conventional carrier reproducing circuit will be described below.

FIG. 16 of the accompanying drawings shows in block form a conventional QAM radio receiver. As shown in FIG. 16, the radio receiver has a quadrature demodulator 11 comprising two mixers and a 90° phase shifter. The quadrature demodulator 11 demodulates an inputted modulated wave with a reproduced carrier from a voltage-controlled oscillator 21, and outputs an I-channel signal and a Q-channel signal. The I-channel signal and the Q-channel signal are processed by respective rolloff filters 12, 13, respective A/D converters 14, 15, and a waveform equalizer 16, which outputs a baseband signal. A phase error decision circuit 17 compares the position of the baseband signal in a phase-amplitude signal space which is defined by a horizontal axis represented by the amplitude of the I-channel signal and a vertical axis represented by the amplitude of the Q-channel signal, with given signals, e.g., signals on 16 grid points in a 4×4 matrix for 16QAM, to detect a phase error, and outputs a 2-bit phase error signal.

FIG. 17 of the accompanying drawings shows the phase error decision circuit 17 in detail. As shown in FIG. 17, the phase error decision circuit 17 comprises two exclusive-OR gates 17a, 17b. The exclusive-OR gate 17a is supplied with most significant bits of a Q-channel polarity signal and an I-channel error signal, and the exclusive-OR gate 17b is supplied with most significant bits of an I-channel polarity signal and a Q-channel error signal. In a 16QAM phase-amplitude signal space shown in FIG. 18 of the accompanying drawings (signal positions are indicated by "x"), if the value of an inputted baseband signal is positioned at a point A, for example, then each of the I-channel polarity signal and the Q-channel polarity signal is "1". Since the point A is on the right side of a signal point P1 which is at the center of a region RO which is surrounded with a thick line, the most significant bit of the I-channel error signal is "1", and also since the point A is lower than the signal point P1, the most significant bit of the Q-channel error signal is "0". Therefore, the exclusive-OR gate 17a outputs a signal "0", and the exclusive-OR gate 17b outputs a signal "1".

In FIG. 16, when the baseband signal is out of phase, a region decision circuit 18 decides, based on the value of the baseband signal, whether the baseband signal is present in a predetermined region in the phase-amplitude signal space or not. If the baseband signal is present in the predetermined region in the phase-amplitude signal space, then the region decision circuit 18 outputs a decision signal indicating that the baseband signal can be synchronized to a selecting circuit 19. If the baseband signal is not present in the predetermined region in the phase-amplitude signal space, then the region decision circuit 18 outputs a decision signal indicating that the baseband signal cannot be synchronized to the selecting circuit 19. The decision circuit 18 does not make any decision when the baseband signal is in phase. As shown in FIG. 19 of the accompanying drawings, the predetermined region comprises four small regions R1~R4 extending around respective four signal points that are farthest from the origin in the phase-amplitude signal space.

In FIG. 16, when the baseband signal is in phase, the selecting circuit 19 supplies an output signal from the phase error decision circuit 17 to an integrating circuit 20 at all times. When the baseband signal is out of phase, the selecting circuit 19 supplies an output signal from the phase error decision circuit 17 to the integrating circuit 20 in response to a region decision signal from the region decision circuit 18, indicating that the baseband signal can be synchronized, and the selecting circuit 19 supplies a preceding output signal from the phase error decision circuit 17 to the integrating circuit 20 in response to a region decision signal from the region decision circuit 18, indicating that the baseband signal cannot be synchronized.

FIG. 20 of the accompanying drawings shows an internal structure of the selecting circuit 19 in detail. As shown in FIG. 20, the selecting circuit 19 comprises two D flip-flops 19a, 19b having respective D terminals supplied with an error decision signal from the phase error decision circuit 17, and respective CK terminals supplied with a decision signal from the region decision circuit 18. When the baseband signal is in phase, the region decision circuit 18 supplies a signal "1" to the CK terminals of the D flip-flops 19a, 19b each time a baseband signal is applied. When the baseband signal is out of phase, the region decision circuit 18 supplies a region decision signal "1" to the CK terminals of the D flip-flops 19a, 19b only if the baseband signal is present in the predetermined region.

In FIG. 16, the integrating circuit 20 generates a control signal for the voltage-controlled oscillator 21 based on a phase error signal from the selecting circuit 19.

FIG. 21 of the accompanying drawings shows an internal structure of the integrating circuit 20 in detail. As shown in FIG. 21, the integrating circuit 20 comprises a differential amplifier 20a, a comparator 20b, and a lag-lead filter 20c. Operation of the integrating circuit 20 at the time the baseband signal is in phase will be described with reference to FIG. 18. If the value of an inputted baseband signal is positioned at the point A, for example, the exclusive-OR gate 17a outputs a signal "0", and the exclusive-OR gate 17b outputs a signal "1", as described above. Therefore, an inverting terminal (−) of the differential amplifier 20a is supplied with a phase error signal "0", and a noninverting terminal (+) of the differential amplifier 20a is supplied with a phase error signal "1". The comparator 20b outputs a signal "1". If the comparator 20b outputs a signal "1" with respect to the value of a subsequently inputted baseband signal, then the lag-lead filter 20c outputs, to the voltage-controlled oscillator 21, a control signal having a control voltage for rotating the baseband signal counterclockwise (in a positive direction +), e.g., bringing the point A of the baseband signal closer to the signal point P1.

When the baseband signal is out of phase, the baseband signal is rotated in the phase-amplitude signal space as shown in FIG. 22 of the accompanying drawings. If the baseband signal is present in the predetermined region composed of the small regions R1~R4 under such conditions, the integrating circuit 20 outputs the same control signal to the voltage-controlled oscillator 21 as when the baseband signal is in phase as described above. If the baseband signal is present outside of the predetermined region, then the integrating circuit 20 outputs the same control signal to the voltage-controlled oscillator 21 as the preceding control signal. Specifically, when the baseband signal is rotating counterclockwise (in the positive direction +), the integrating circuit 20 outputs a control signal for rotating the baseband signal clockwise (in a negative direction −) to the voltage-controlled oscillator 21 even though the baseband signal goes away from any of the small regions R1~R4. When the baseband signal is rotating clockwise (in the negative direction −), the integrating circuit 20 outputs a control signal for rotating the baseband signal counterclockwise (in the positive direction +) to the voltage-controlled oscillator 21 even though the baseband signal goes away from any of the small regions R1~R4. Accordingly, the baseband signal which is to stay still at the signal points at the four corners of the square pattern in the phase-amplitude signal space is shifted to a corresponding signal point, thus completing baseband signal synchronization.

In a QAM system in which normal signal points are located in a non-square pattern in a phase-amplitude signal space, however, since there are no signal points at the four corners in the phase-amplitude signal space, the conventional QAM radio receiver cannot determine a phase error when a baseband signal is not synchronized, and hence can not bring the baseband signal into synchronization.

SUMMARY OF THE INVENTION

It is therefore an object of the present invention to provide a carrier reproducing circuit which is capable of determining a phase error when a baseband signal is out of phase and hence bringing the baseband signal into phase, even for a QAM system in which normal signal points are located in a non-square pattern in a phase-amplitude signal space.

To achieve the above object, there is provided in accordance with the present invention a carrier reproducing circuit for a multi-valued quadrature amplitude modulation system in which normal signal points are located in a non-square pattern in a phase-amplitude signal space, comprising carrier outputting means for outputting a carrier which has a frequency and phase depending on a control signal, quadrature demodulating means for quadrature-demodulating an inputted signal with the carrier and outputting a baseband signal, phase error detecting means for detecting a phase error between the position of the baseband signal in a phase-amplitude signal space and the position of a corresponding one of a plurality of predetermined normal signal points in the phase-amplitude signal space, control signal generating means for generating the control signal in order to reduce the phase error based on the phase error, first region deciding means for detecting a presence of the baseband signal, when out of phase, in a first region composed of eight small regions defined around eight signal points, farthest from the center of the phase-amplitude signal space, and outputting a first signal, second region deciding means for detecting a presence of the baseband signal, when out of phase, in a second region composed of four small regions defined across the axes of the phase-amplitude signal space outside of the normal signal points, and outputting a second signal, and selective outputting means for outputting a phase error detected by the phase error detecting means with respect to the baseband signal at the time the first signal is outputted, to the control signal generating means, if the second signal is not outputted over a predetermined period of time around the time at which the first signal is outputted, and outputting a phase error detected by the phase error detecting means with respect to the baseband signal at the time the first signal is outputted in a preceding cycle, to the control signal generating means, if the second signal is outputted in the predetermined period of time.

According to the present invention, there is also provided a carrier reproducing circuit for a multi-valued quadrature amplitude modulation system in which normal signal points are located in a non-square pattern in a phase-amplitude signal space, comprising carrier outputting means for outputting a carrier which has a frequency and phase depending on a control signal, quadrature demodulating means for quadrature-demodulating an inputted signal with the carrier and outputting a baseband signal, phase error detecting means for detecting a phase error between the position of the baseband signal in a phase-amplitude signal space and the position of a corresponding one of a plurality of predetermined normal signal points in the phase-amplitude signal space, outputting a first signal if the baseband signal is leading the corresponding normal signal point in phase, and outputting a second signal if the baseband signal is lagging the corresponding normal signal point in phase, control signal generating means for generating a control signal to delay the carrier in phase when the first input signal is inputted thereto, and generating a control signal to advance the carrier in phase when the second input signal is inputted thereto, the phase-amplitude signal space containing small square segments in respective quadrants thereof, which are devoid of normal signal points if the normal signal points are arranged in a square pattern, each of the small square segments being divided into a leading phase region and a lagging phase region by a straight line passing through the origin of the phase-amplitude signal space, region deciding means for detecting a presence of the baseband signal in the leading phase region and outputting the second signal when the baseband signal is out of phase, and detecting a presence of the baseband signal in the lagging phase region and outputting the first signal when the baseband signal is out of phase, and selective outputting means for causing the control signal generating means to output an output signal from the phase error detecting means when the baseband signal is in phase, and causing the control signal generating means to output an output signal from the region deciding means when the baseband signal is out of phase.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a block diagram illustrating how an identifying circuit in the carrier reproducing circuit shown in FIG. 5 operates;

FIG. 8 is a block diagram illustrating how a selecting circuit in the carrier reproducing circuit shown in FIG. 5 operates;

DETAILED DESCRIPTION OF THE PREFERRED EMBODIMENTS

Figure 1:
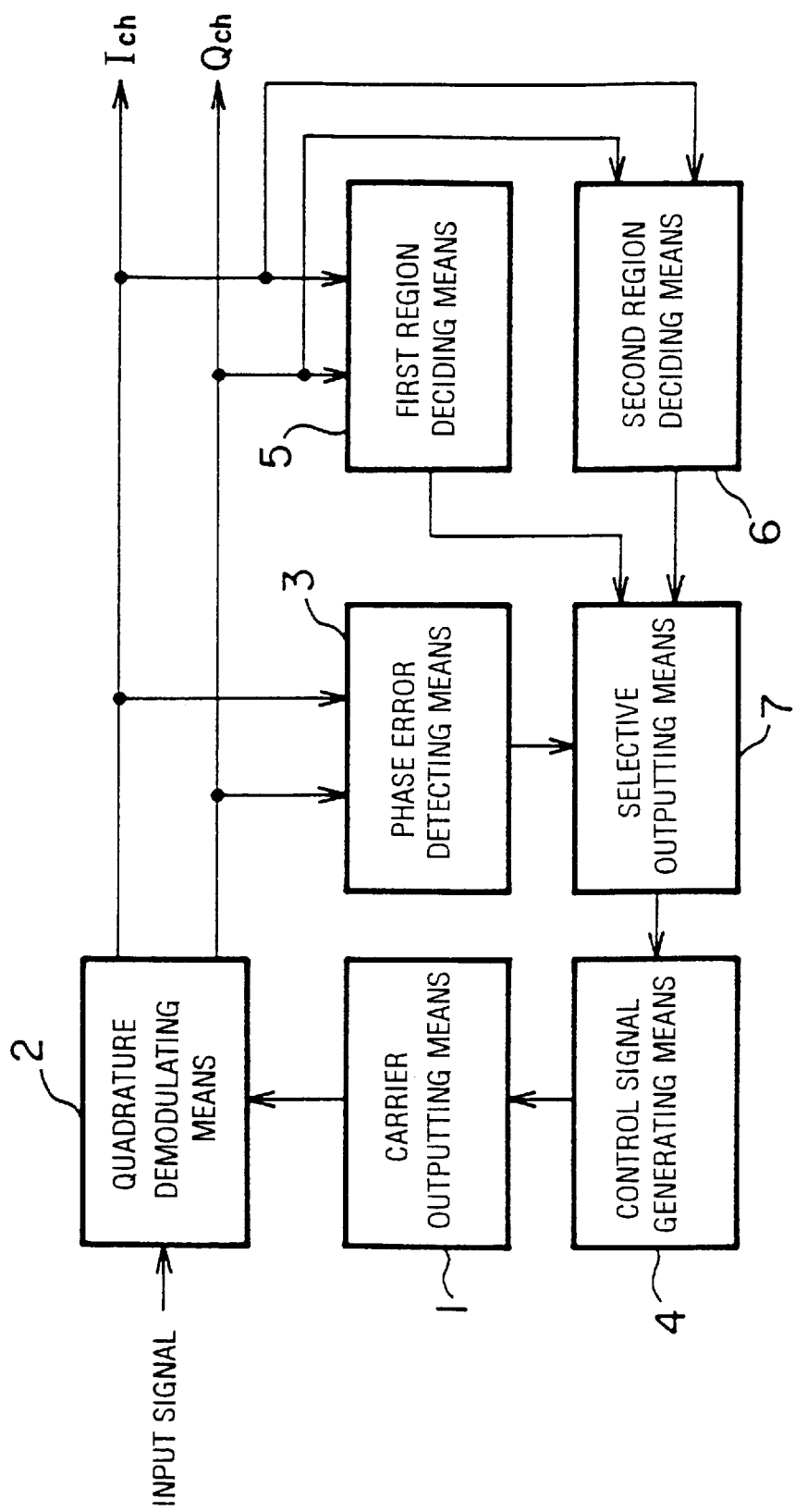
FIG. 1 is a block diagram showing the principles of a carrier reproducing circuit according to a first embodiment of the present invention.

The principles of a carrier reproducing circuit according to a first embodiment of the present invention will first be described below with reference to FIG. 1. As shown in FIG. 1, the carrier reproducing circuit according to the first embodiment comprises a carrier outputting means 1 for outputting a carrier which has a frequency and phase depending on a control signal, a quadrature demodulating means 2 for quadrature-demodulating an inputted signal with the carrier outputted from the carrier outputting means 1 and outputting a baseband signal, a phase error detecting means 3 for detecting a phase error between the position of the baseband signal in a phase-amplitude signal space and the position of a corresponding one of a plurality of predetermined normal signal points in the phase-amplitude signal space, a control signal generating means 4 for generating the control signal in order to reduce the phase error based on the phase error which has been detected by the phase error detecting means 3, a first region deciding means 5 for detecting a presence of the baseband signal, when out of phase, in a first region composed of eight small regions defined around eight signal points, farthest from the center of the phase-amplitude signal space, and outputting a first signal, a second region deciding means 6 for detecting a presence of the baseband signal, when out of phase, in a second region composed of four small regions defined across the axes of the phase-amplitude signal space outside of the normal signal points, and outputting a second signal, and a selective outputting means 7 for outputting a phase error detected by the phase error detecting means 3 with respect to the baseband signal at the time the first signal is outputted, to the control signal generating means 4, if the second signal is not outputted over a predetermined period of time around the time at which the first signal is outputted, and outputting a phase error detected by the phase error detecting means 3 with respect to the baseband signal at the time the first signal is outputted in a preceding cycle, to the control signal generating means 4, if the second signal is outputted in the predetermined period of time.

Figure 2:
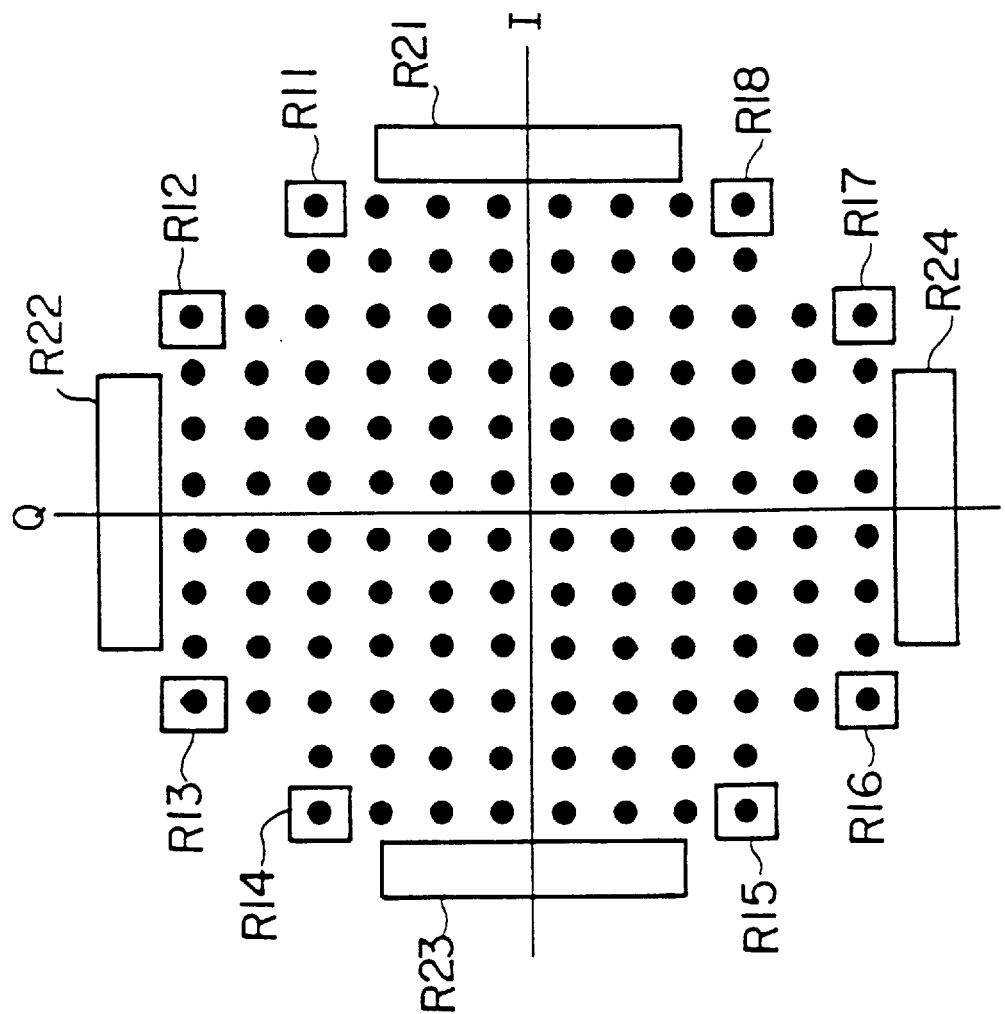
FIG. 2 is a constellation diagram of a pattern of 128QAM normal signal points in a phase-amplitude signal space.
Figure 3:
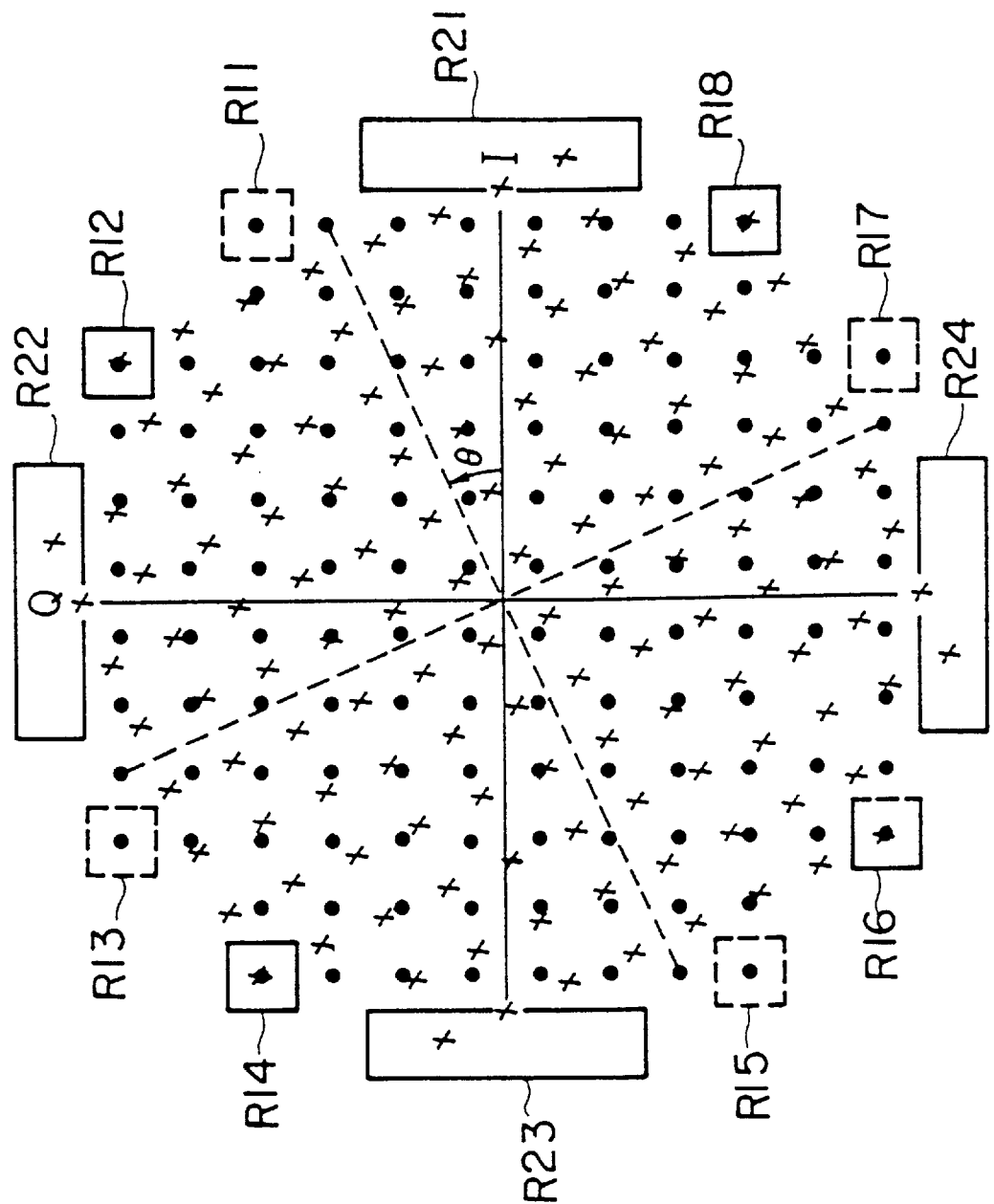
FIG. 3 is a constellation diagram showing the manner in which a baseband signal rotates about an origin in the phase-amplitude signal space.

FIG. 2 shows a pattern of 128QAM normal signal points in a phase-amplitude signal space known as a constellation plot or diagram. In FIG. 2, regions R11~R18 make up the first region referred to above, and regions R21~R24 make up the second region referred to above. When the baseband signal is out of phase, it rotates about the origin of the phase-amplitude signal space, as shown in FIG. 3. In FIG. 3, the locations of normal signal points are indicated by solid dots, and the locations of signal points to which the baseband signal has rotated θ (=+II/12) from the locations of normal signal points are indicated by x. As can be seen from FIG. 3, according to the pattern of the locations of normal signal points, signal points are present in the first region (the regions R11~R18), but no signal points are present in the second region (the regions R21~R24). According to the pattern of the locations of signal points to which the baseband signal has rotated θ (=+II/12), signal points are present in the regions R12, R14, R16, R18 of the first region, but no signal points are present in the regions R11, R13, R15, R17 of the first region. At this time, signal points are present in the second region (the regions R21~R24). Therefore, even if a baseband signal is detected in the first region (the regions R11~R18), the baseband may not be brought into phase or synchronization at the time.

Figure 4:
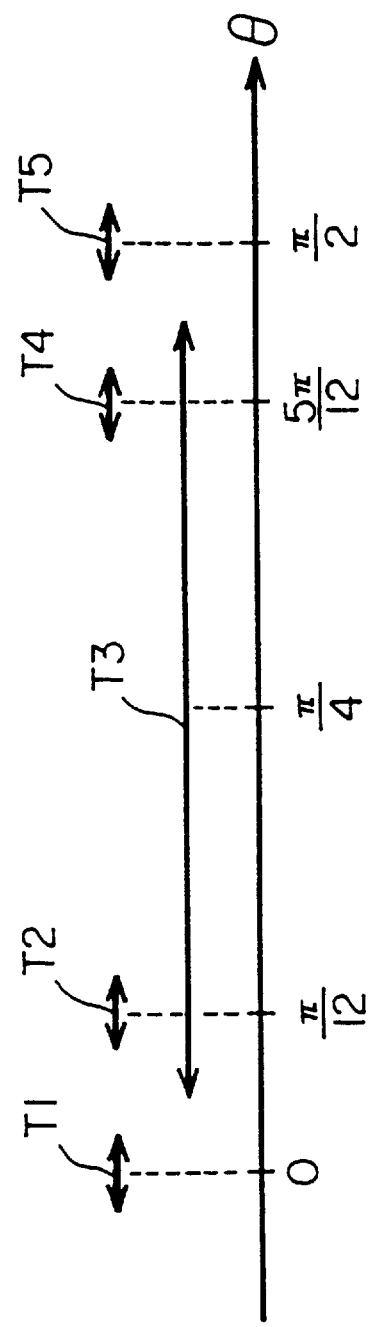
FIG. 4 is a diagram indicating how signal points can be present first and second regions or not as the angle of θ varies.

FIG. 4 shows how signal points can be present in the first and second regions or not as the angle of θ varies.

Specifically, as shown in FIG. 4, signal points can simultaneously be present in all the regions R11~R18 of the first region in periods T1, T5. In a period T2, signal points can be present in only the regions R12, R14, R16, R18 of the first region. In a period T4, signal points can be present in only the regions R11, R13, R15, R17 of the first region. In periods T2, T3 and T4 signal points can be present in the second region (the regions R21~R24). The baseband signal can be brought into phase only in the periods T1, T5. Therefore, when a baseband signal inputted when out of phase is detected as being present in any of the regions R11~R18 of the first region (such a baseband signal will be referred to as a "particular baseband signal"), if the presence of another baseband signal is not detected in the second region (the regions R21~R24) over a predetermined period of time around the time at which the particular baseband signal is inputted, then it can be determined that the particular baseband signal is detected in the periods T1, T5 in which it can be brought into phase. The particular baseband signal may be brought into phase only in this case.

Specifically, with a QAM system in which normal signal points are located in a non-square pattern in a phase-amplitude signal space, there are two signal points of maximum amplitude in each of the quadrants of the phase-amplitude signal space, and a particular baseband signal may not necessarily be brought into phase even when the particular baseband signal is detected as being present in the first region (the regions R11~R18) around those two signal points in each of the quadrants. The periods in which signal points can be present include not only the periods T1, T5, but also the periods T2, T4 in which the baseband signal cannot be brought into phase. However, when it is confirmed that another baseband signal is not present in the second region (the regions R21~R24), it is detected that the baseband signal can be brought into phase. It is confirmed that another baseband signal is not present in the second region over a predetermined period of time because a baseband signal is inputted one by one, and it takes a certain period of time until the presence of a baseband signal in the second region is confirmed.

Figure 5:
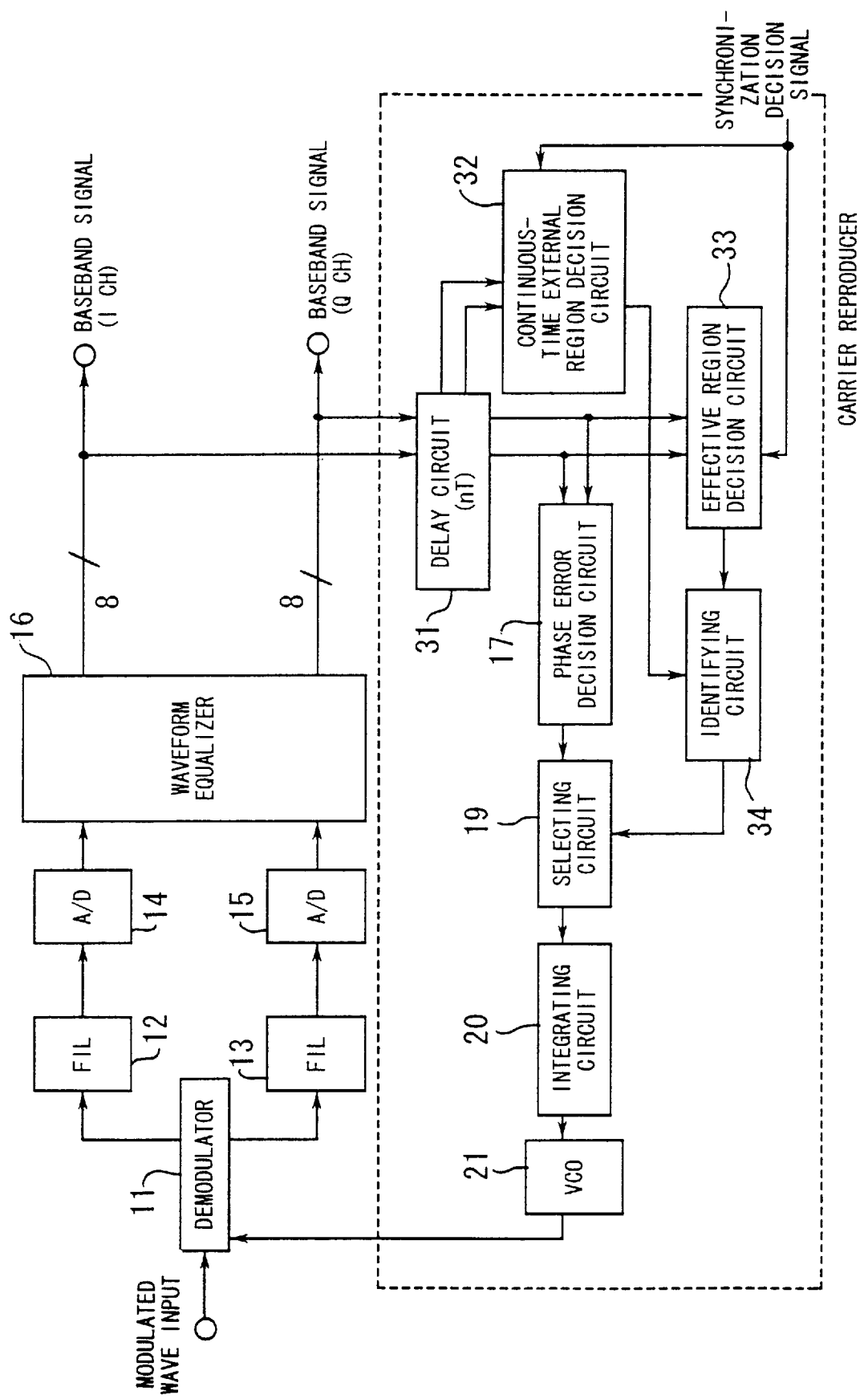
FIG. 5 is a block diagram of the carrier reproducing circuit according to the first embodiment of the present invention.
Figure 16:
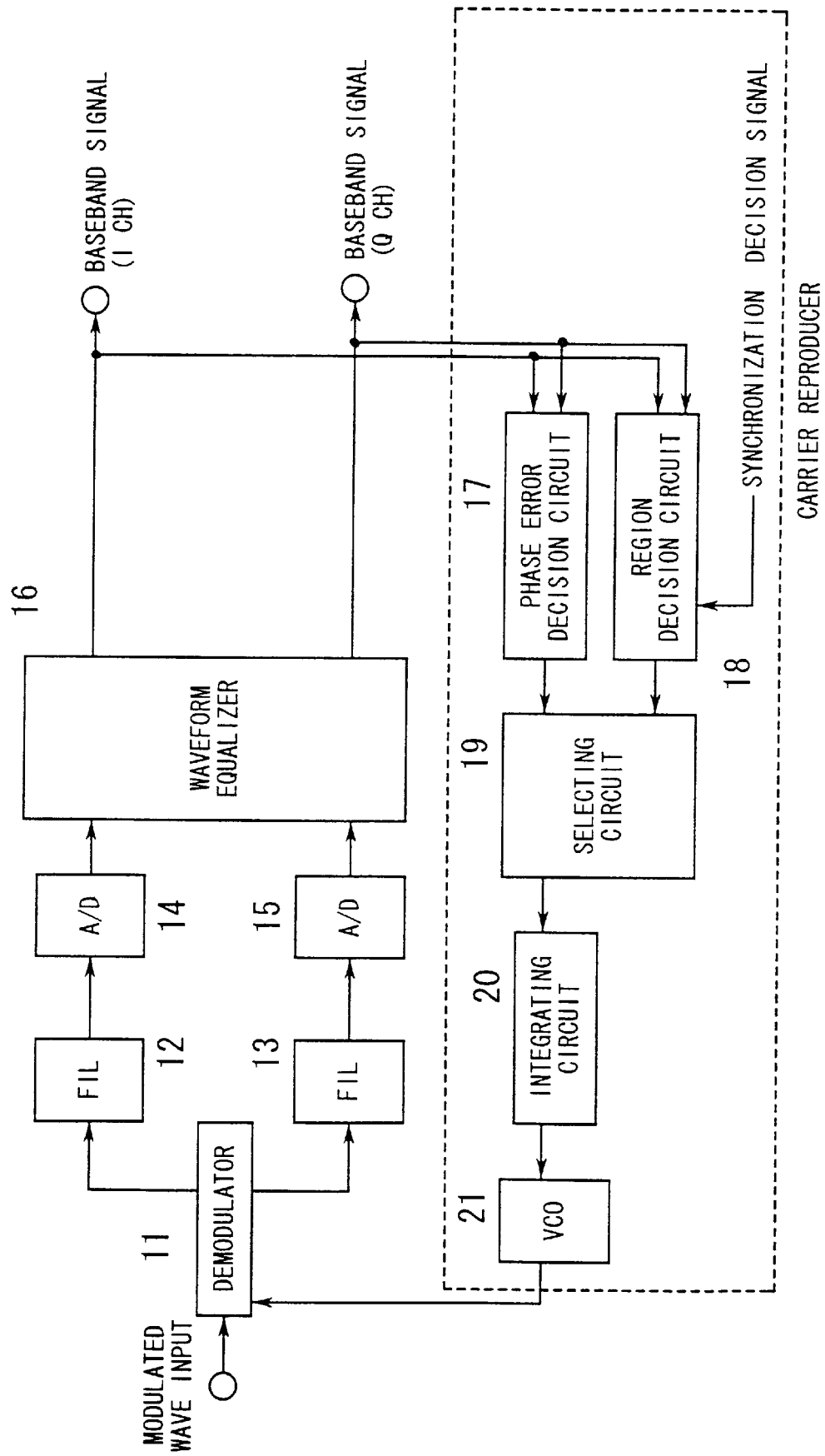
FIG. 16 is a block diagram of a conventional QAM radio receiver.
Figure 17:
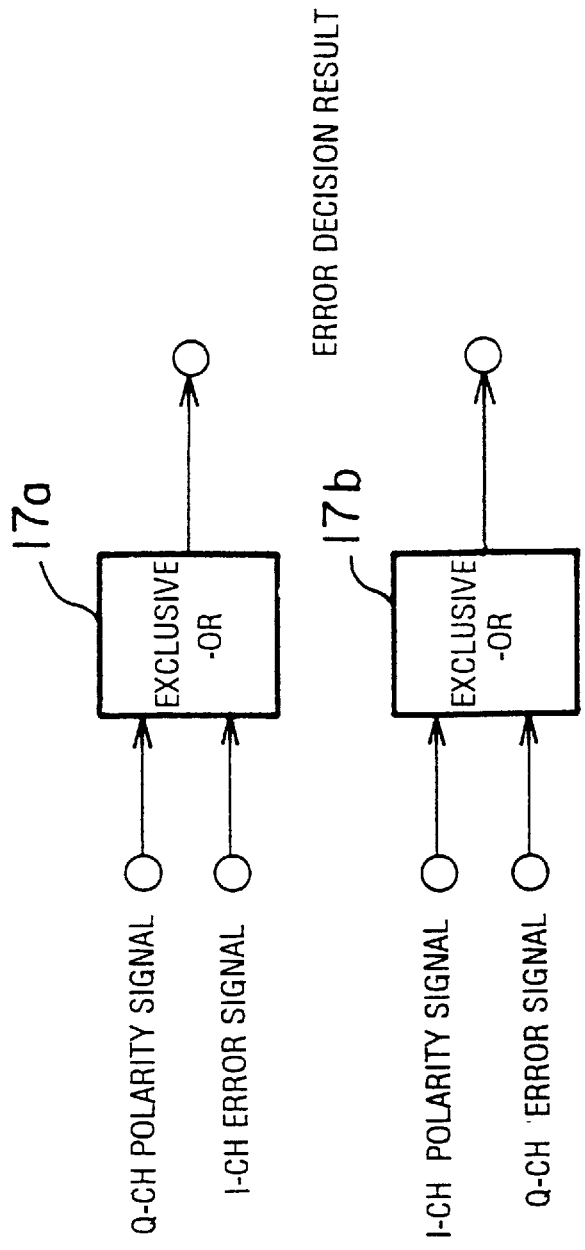
FIG. 17 is a block diagram of an internal structure of a phase error decision circuit in the conventional QAM radio receiver.
Figure 18:
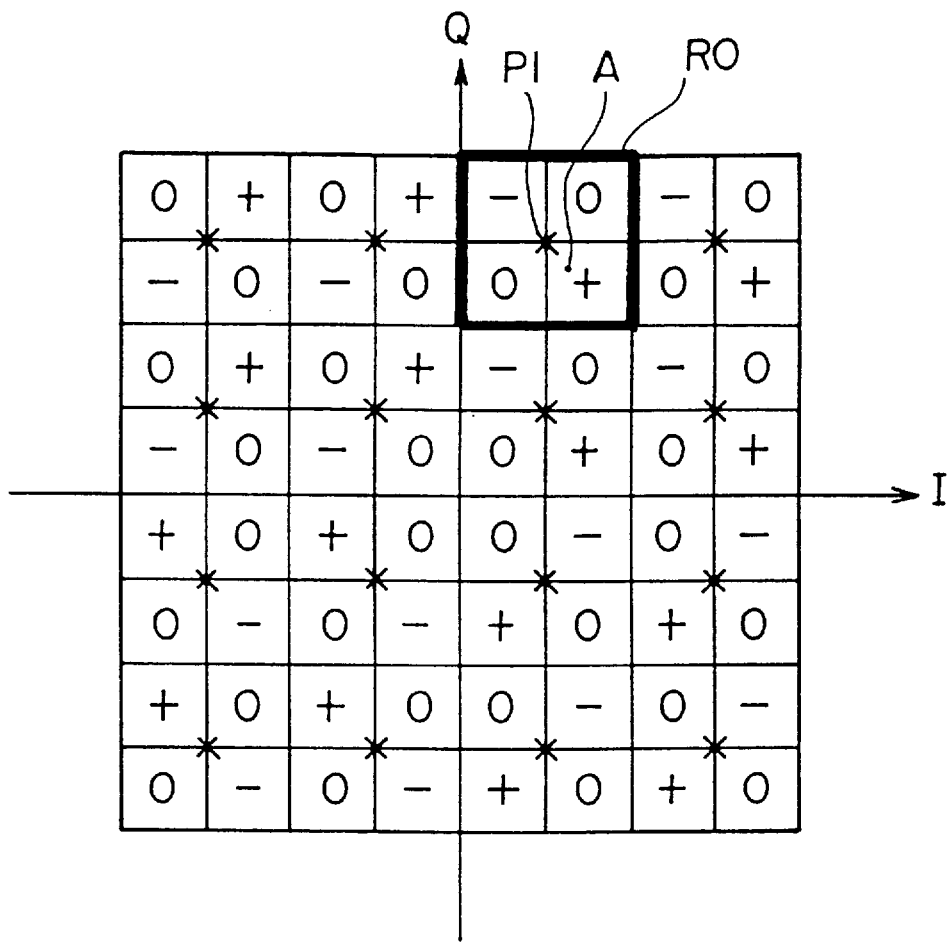
FIG. 18 is a constellation diagram showing how exclusive-OR gates shown in FIG. 17 operates.

FIG. 5 shows in detailed block form the carrier reproducing circuit according to the first embodiment shown in FIG. 1. Those parts shown in FIG. 5 which are identical to those shown in FIG. 16 are denoted by identical reference numerals, and will not be described later on. The relationship between the carrier reproducing circuit shown in FIG. 1 and the carrier reproducing circuit shown in FIG. 5 will be described later on after the carrier reproducing circuit shown in FIG. 5 will be described.

As shown in FIG. 5, a delay circuit 31 delays a baseband signal in I and Q channels, sends a baseband signal at a time t to the phase error decision circuit 17 and an effective region decision circuit 33, and sends a baseband signal which has been inputted at given times (t−nT), t, (t+nT)(T is the sampling period of the baseband signal, n=1, 2, 3, . . .) around the time t to a continuous-time external region decision circuit 32. When the baseband signal is out of phase, the continuous-time external region decision circuit 32 decides whether the baseband signal is present in the second region at the times (t−nT), t, (t+nT) or not. When the baseband signal is out of phase, the effective region decision circuit 33 decides whether the baseband signal inputted at the time t is present in the first region or not. An identifying circuit 34 sends a decision signal indicating that the baseband signal can be brought into phase to a selecting circuit 19 when the effective region decision circuit 33 decides that the baseband signal inputted at the time t is present in the first region and also when the continuous-time external region decision circuit 32 decides that the baseband signal is not present in the second region at the times (t−nT), t, (t+nT). Otherwise, the identifying circuit 34 sends a decision signal indicating that the baseband signal cannot be brought into phase. In response to the decision signal indicating that the baseband signal can be brought into phase, the selecting circuit 19 supplies an output signal from the phase error decision circuit 17 to the integrating circuit 20. In response to the decision signal indicating that the baseband signal cannot be brought into phase, the selecting circuit 19 supplies a preceding output signal from the phase error decision circuit 17 to the integrating circuit 20.

The carrier outputting means 1 shown in FIG. 1 corresponds to the voltage-controlled oscillator 21 shown in FIG. 5, and the quadrature demodulating means 2 shown in FIG. 1 corresponds to the quadrature demodulator 11, the rolloff filters 12, 13, the A/D converters 14, 15, and the waveform equalizer 16 shown in FIG. 5. The phase error detecting means 3 shown in FIG. 1 corresponds to the phase error decision circuit 17 shown in FIG. 5, and the control signal generating means 4 shown in FIG. 1 corresponds to the integrating circuit 20 shown in FIG. 5. The first region deciding means 5 shown in FIG. 1 corresponds to the effective region decision circuit 33 shown in FIG. 5, and the second region deciding means 6 shown in FIG. 1 corresponds to the continuous-time external region decision circuit 32 shown in FIG. 5. The selective outputting means 7 shown in FIG. 1 corresponds to the selecting circuit 19 and the identifying circuit 34 shown in FIG. 5.

Figure 6:
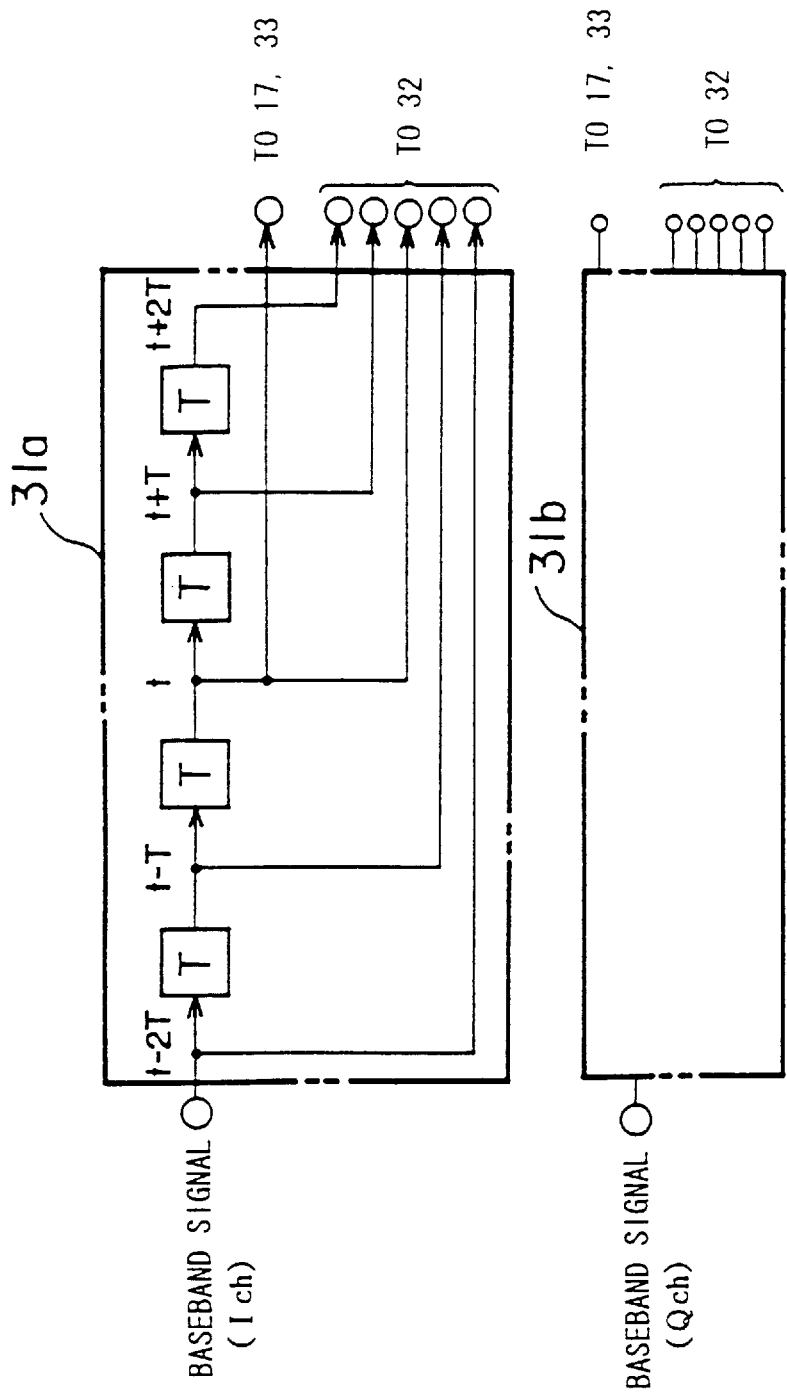
FIG. 6 is a block diagram of an internal structure of a delay circuit in the carrier reproducing circuit shown in FIG. 5.

FIG. 6 shows an internal structure of the delay circuit 31 in block form, with n=1, 2. As shown in FIG. 6, the delay circuit 31 comprises two shift registers 31a, 31b. The shift register 31a is supplied with an I-channel baseband signal, and the shift register 31b is supplied with a Q-channel baseband signal. Each of the shift registers 31a, 31b has four delay units each for delaying an inputted signal for a time T. Each of the shift registers 31a, 31b outputs a baseband signal at a position (time t) which has been delayed by a time 2T to the phase error decision circuit 17 and the effective region decision circuit 33, and outputs baseband signals at respective positions times (t−2T), (t−T), t, (t+T), (t+2T) which have been delayed respectively by times 0, T, 2T, 3T, 4T to the continuous-time external region decision circuit 32.

In FIG. 5, the continuous-time external region decision circuit 32 decides whether the five baseband signals delivered from the delay circuit 31 are present in the second region or not when they are out of phase. If even one of the five baseband signals is present in the second period, then the continuous-time external region decision circuit 32 outputs a signal "0". If none of the five baseband signals is not present in the second region, then the continuous-time external region decision circuit 32 outputs a signal "1". The continuous-time external region decision circuit 32 make such decisions using a ROM, for example.

The effective region decision circuit 33 decides whether the baseband signal at the time t delivered from the delay circuit 31 is present in the first region or not when it is out of phase. If the baseband signal is present in any one of the regions R11~R18 of the first region, then the effective region decision circuit 33 outputs a signal "1". If the baseband signal is not present in any one of the regions R11~R18 of the first region, then the effective region decision circuit 33 outputs a signal "0". The effective region decision circuit 33 make such decisions using a ROM, for example.

The identifying circuit 34 operates to make identifications or decisions as shown in FIG. 7. Only when the identifying circuit 34 is supplied with the signal "1" from the effective region decision circuit 33 and the signal "1" from the continuous-time external region decision circuit 32, i.e., when the effective region decision circuit 33 decides that the baseband signal inputted at the time t is present in the first region and the continuous-time external region decision circuit 32 decides that no baseband signal is present in the second region at a given time, the identifying circuit 34 outputs a signal "1" indicating that the baseband signal can be brought into phase. Otherwise the identifying circuit 34 outputs a signal "0" indicating that the baseband signal cannot be brought into phase.

When the baseband signal is in phase, the selecting circuit 19 outputs an output signal from the phase error decision circuit 17 to the integrating circuit 20 at all times. When the baseband signal is out of phase, the selecting circuit 19 outputs an output signal from the phase error decision circuit 17 to the integrating circuit 20 in response to the signal "1" from the identifying circuit 34, and outputs a preceding output signal from the phase error decision circuit 17 to the integrating circuit 20 in response to the signal "0" from the identifying circuit 34, as shown in FIG. 8.

Therefore, when the baseband signal is out of phase, the state in which signal points can be present in all the regions R11~R18 of the first region, i.e., the state in which the baseband signal can be brought into phase, is reliably detected. Accordingly, baseband signals can be synchronized even in a QAM system in which normal signal points are located in a non-square pattern in a phase-amplitude signal space.

In the first embodiment, n=1, 2 is assumed in the delay circuit 31 shown in FIG. 6. However, the present invention is not limited to n=1, 2. If, for example, n is set to a value or 3 or greater, then the probability of erroneous baseband signal synchronization will be reduced though more time will be required by baseband signal synchronization.

The carrier reproducing circuit according to the first embodiment has been described with respect to the pattern of locations of 128QAM signal points. However, the principles of the first embodiment are also applicable to other QAM systems than the 128QAM system, in which normal signal points are located in a non-square pattern in a phase-amplitude signal space.

Figure 9:
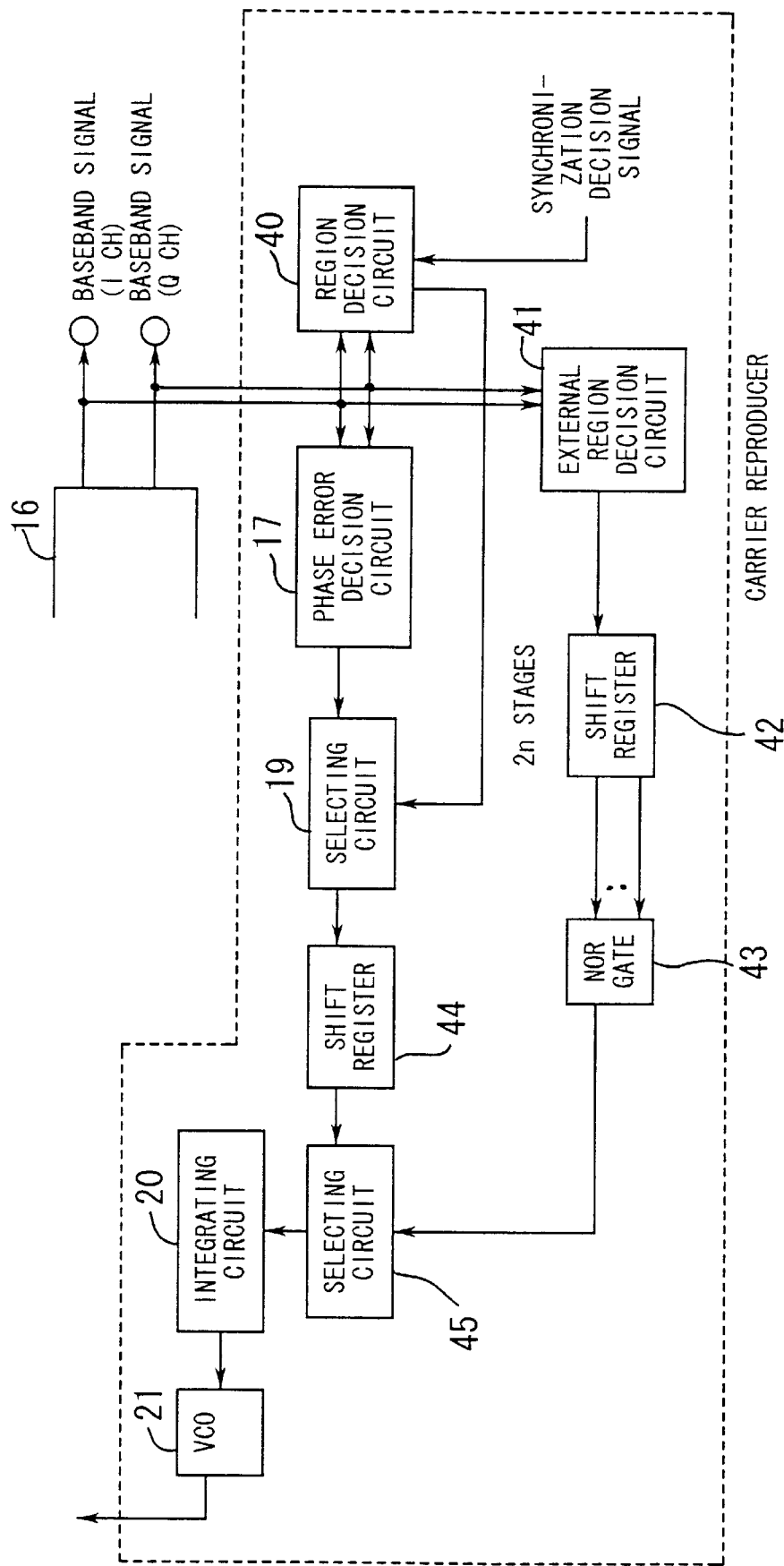
FIG. 9 is a block diagram of a carrier reproducing circuit according to a second embodiment of the present invention.

FIG. 9 shows in block form a carrier reproducing circuit according to a second embodiment of the present invention. Since the carrier reproducing circuit according to the second embodiment is basically the same as the arrangement shown in FIG. 16, those parts shown in FIG. 9 which are identical to those shown in FIG. 16 are denoted by identical reference numerals, and will not be described later on, and some of the identical parts are omitted from illustration. The carrier reproducing circuit according to the second embodiment will be described with respect to the pattern of locations of 128QAM normal signal points, as with the first embodiment. In the second embodiment, first and second regions are also established in the phase-amplitude signal space.

Figure 19:
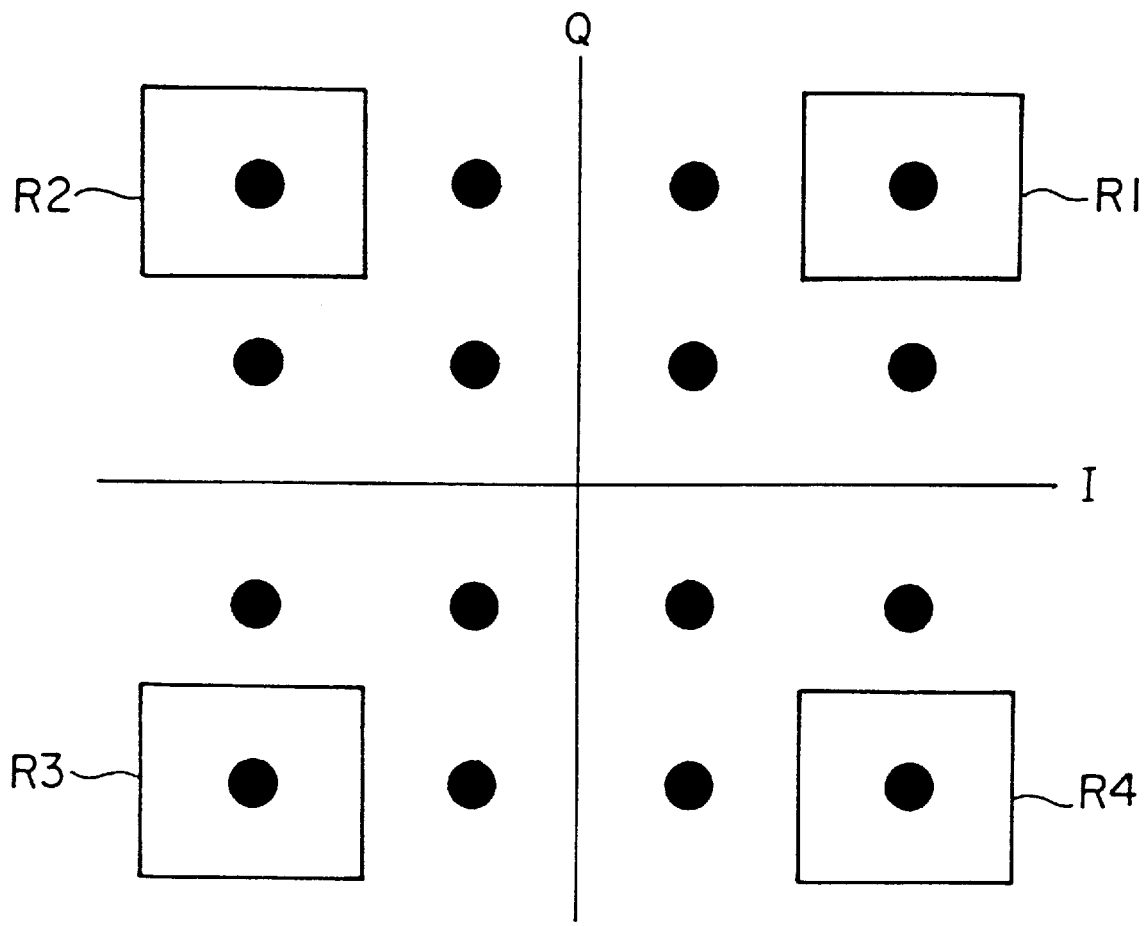
FIG. 19 is a constellation diagram showing a predetermined region.
Figure 20:
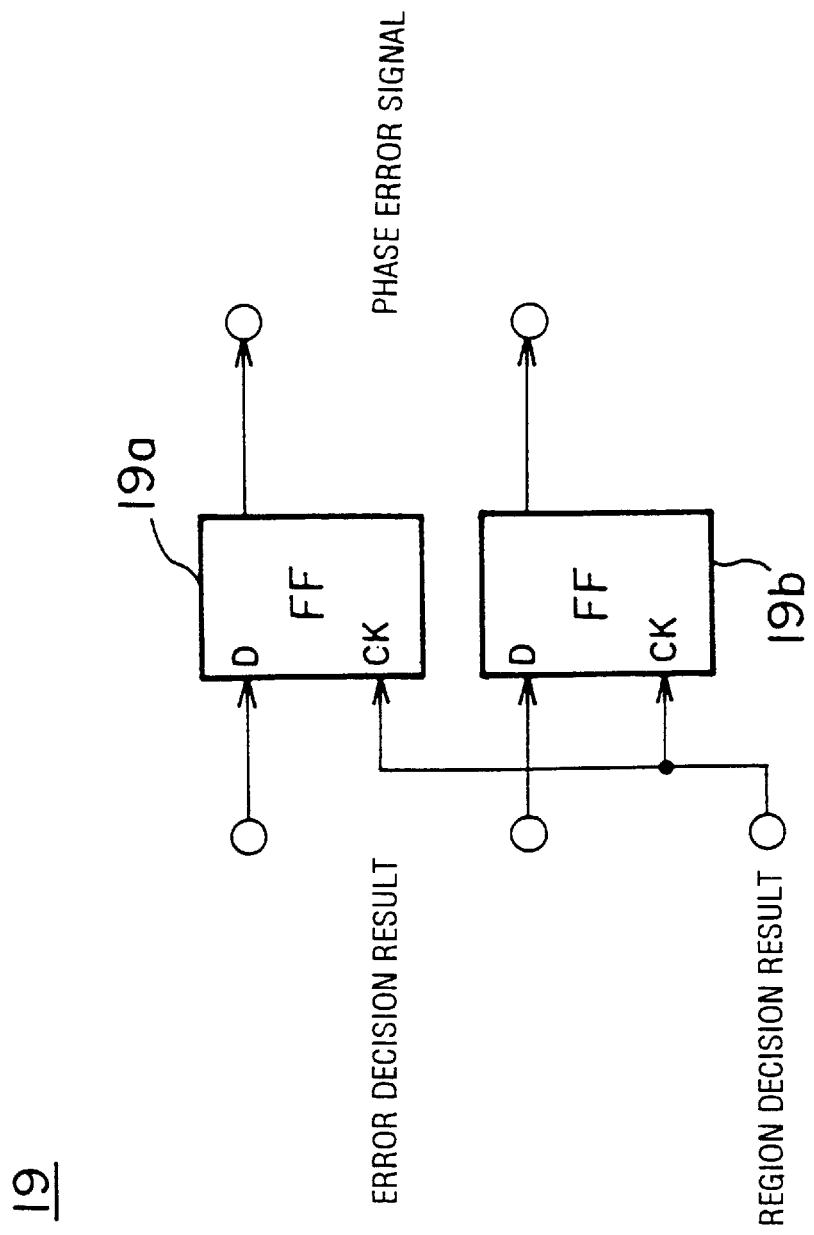
FIG. 20 is a block diagram of an internal structure of a selecting circuit in the conventional QAM radio receiver.
Figure 21:
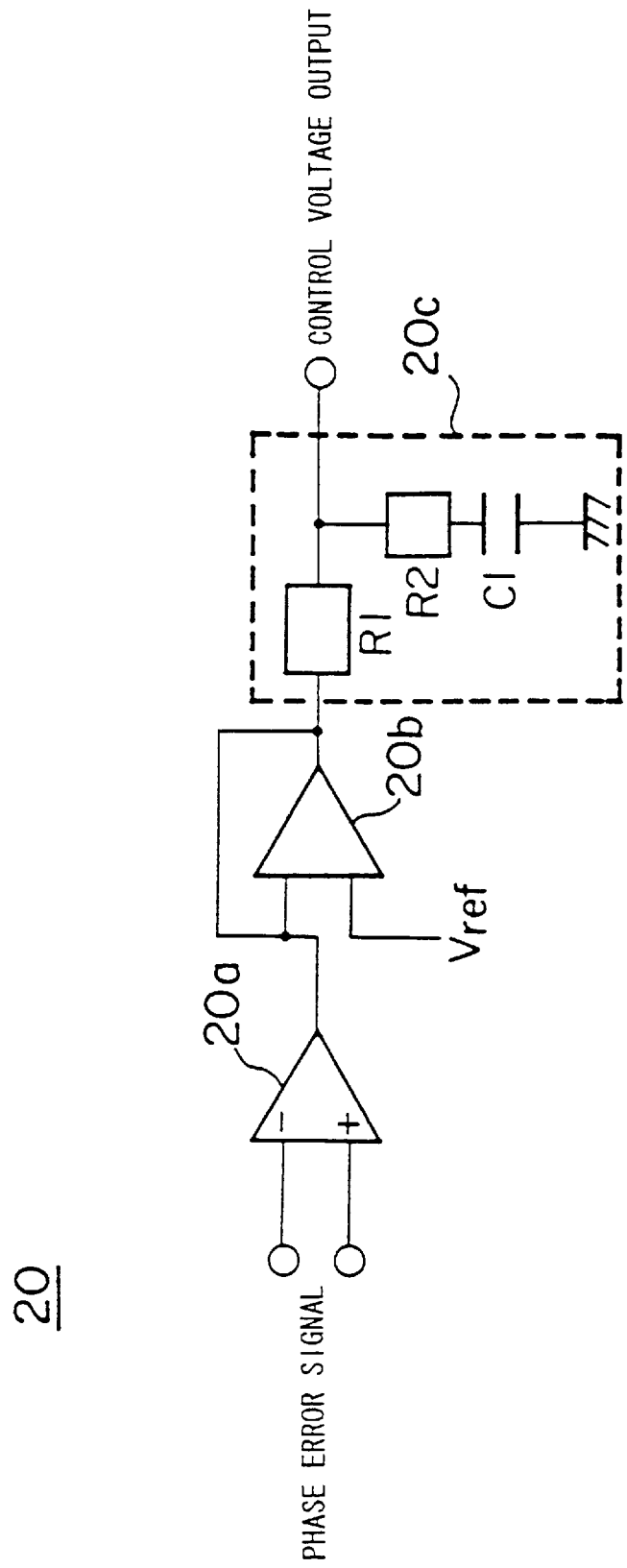
FIG. 21 is a block diagram of an internal structure of an integrating circuit in the conventional QAM radio receiver.
Figure 22:
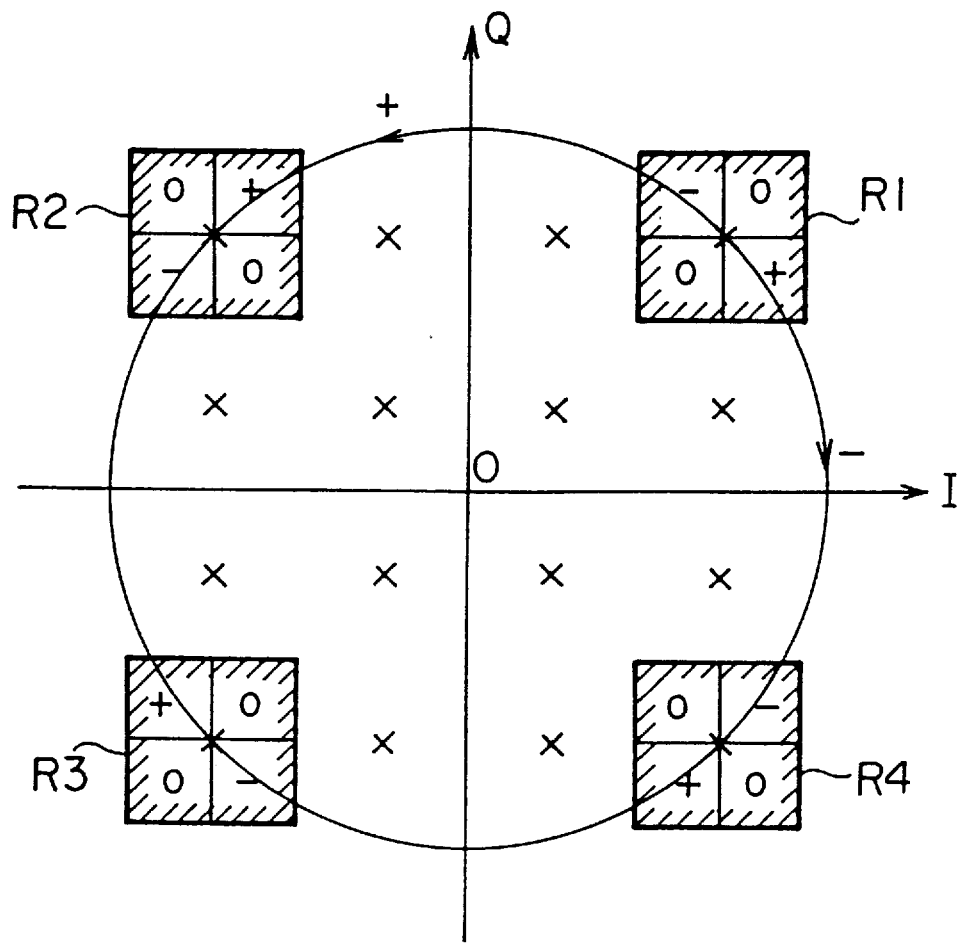
FIG. 22 is a constellation diagram showing the manner in which a baseband signal rotates about an origin in a phase-amplitude signal space.

As shown in FIG. 19, a region decision circuit 40 and an external region decision circuit 41 are supplied with I-and Q-channel baseband signals. When an inputted baseband signal is out of phase, the region decision circuit 40 decides the inputted baseband signal is present in the first region or not, and sends a decision signal to the selecting circuit 19. When a baseband signal is out of phase, the external region decision circuit 41 decides the baseband signal is present in the second region or not, and sends a signal "1" to a shift register 42 if the baseband signal is present in the second region and sends a signal "0" to the shift register 42 if the baseband signal is not present in the second region. When the baseband signal is in phase, the selecting circuit 19 outputs an output signal from the phase error decision circuit 17 to the shift register 44 at all times. When the baseband signal is out of phase, the selecting circuit 19 outputs an output signal from the phase error decision circuit 17 to the shift register 44 in response to a decision signal from the region decision circuit 40, indicating that the baseband signal is present in the first region, and outputs a preceding output signal from the phase error decision circuit 17 to the shift register 44 in response to a decision signal from the region decision circuit 40, indicating that the baseband signal is not present in the first region.

Figure 10:
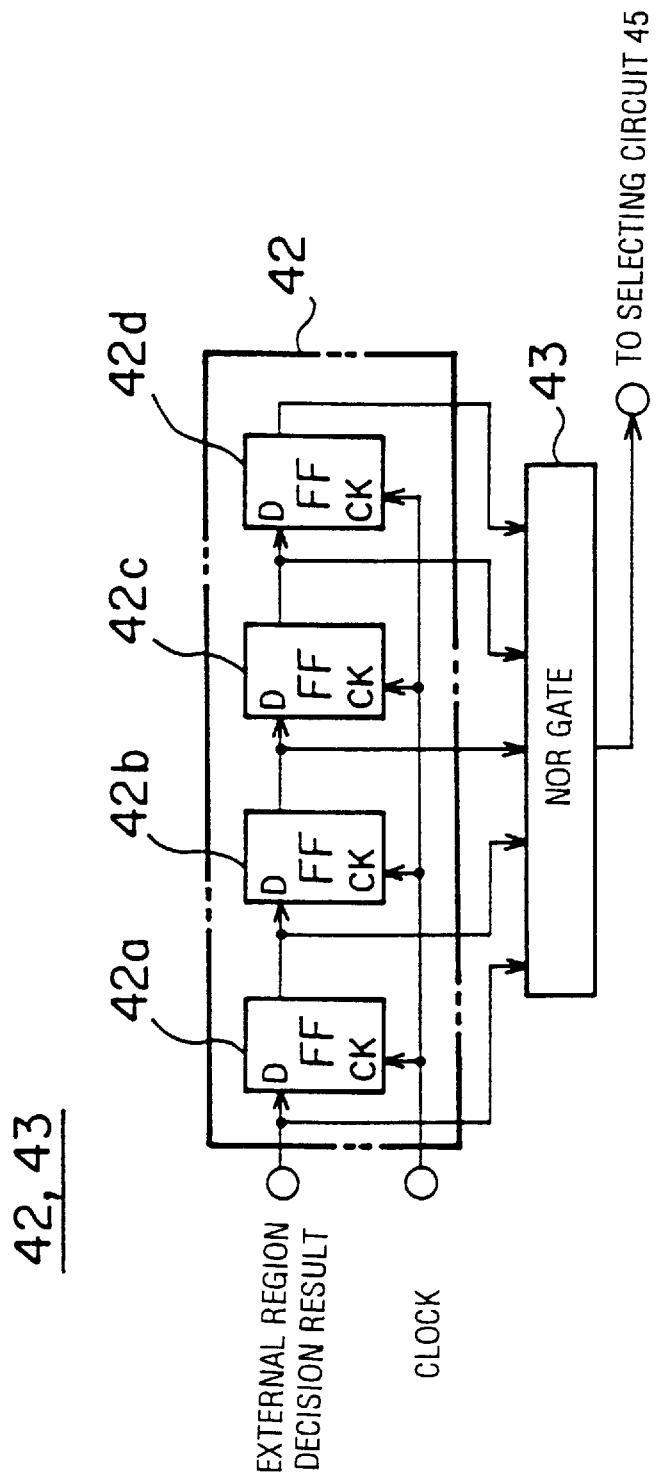
FIG. 10 is a block diagram of an internal structure of a shift register and an NOR gate in the carrier reproducing circuit shown in FIG. 9.

FIG. 10 shows in block form an internal structure of the shift register 42 and a NOR gate 43 shown in FIG. 9. As shown in FIG. 10, the shift register 42 comprises cascaded four D flip-flops 42a~42d. The D flip-flops 42a~42d have respective D terminals supplied with a decision signal from the external region decision circuit 41, and respective CK terminals supplied with a clock signal. The NOR gate 43 is supplied with a decision signal from the external region decision circuit 41 and output signals from the respective D flip-flops 42a~42d. During an interval in which four clock signals are being generated, the NOR gate 43 outputs a signal "0" when either one of baseband signals is present in the second region, and outputs a signal "1" when any of baseband signals is not present in the second region.

Figure 11:
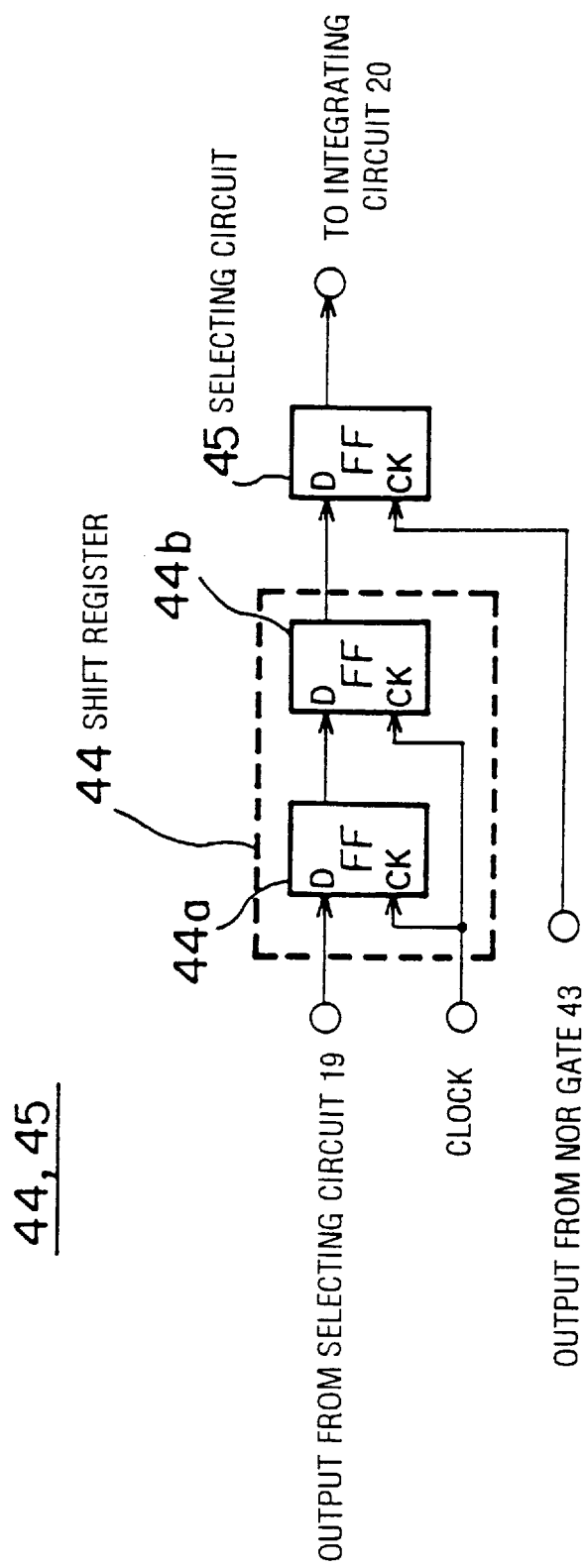
FIG. 11 is a block diagram of an internal structure of a shift register and a selecting circuit in the carrier reproducing circuit shown in FIG. 9.

FIG. 11 shows in block form an internal structure of the shift register 44 and the selecting circuit 45. As shown in FIG. 11, the shift register 44 comprises cascaded two D flip-flops 44a, 44b. The D flip-flops 44a, 44b have respective D terminals supplied with an output signal from the selecting circuit 19, and respective CK terminals supplied with a clock signal. The selecting circuit 45 comprises a D flip-flop having a D terminal connected to an output terminal of the D flip-flop 44b and a CK terminal connected to an output terminal of the NOR gate 43. Therefore, the shift register 44 produces an output signal which is equal to an output signal from the selecting circuit 19 with respect to the baseband signal when two clock signals are generated. Consequently, when the baseband signal is in phase, the selecting circuit 45 outputs a signal which is equal to an output signal from the phase error decision circuit 17 at all times. When the baseband signal is out of phase, the selecting circuit 45 outputs an output signal from the phase error decision circuit 17 to the integrating circuit 20 when the baseband signal inputted at the second clock signal is present in the first region and any one of the five baseband signals inputted up to the fourth clock signal is not present in the second region, and outputs a preceding output signal from the phase error decision circuit 17 to the integrating circuit 20 otherwise.

In this manner, it is possible to bring baseband signals into phase when they are out of phase even in QAM systems in which normal signal points are located in a non-square pattern in a phase-amplitude signal space.

The carrier reproducing circuit according to the second embodiment does not require the delay circuit 31 which is required in the carrier reproducing circuit according to the first embodiment. Since the delay circuit 31 delays all bits needed for making decisions with respect to the regions, the carrier reproducing circuit according to the first embodiment tends to have an increased circuit scale. However, the carrier reproducing circuit according to the second embodiment is free of such a drawback.

Figure 12:
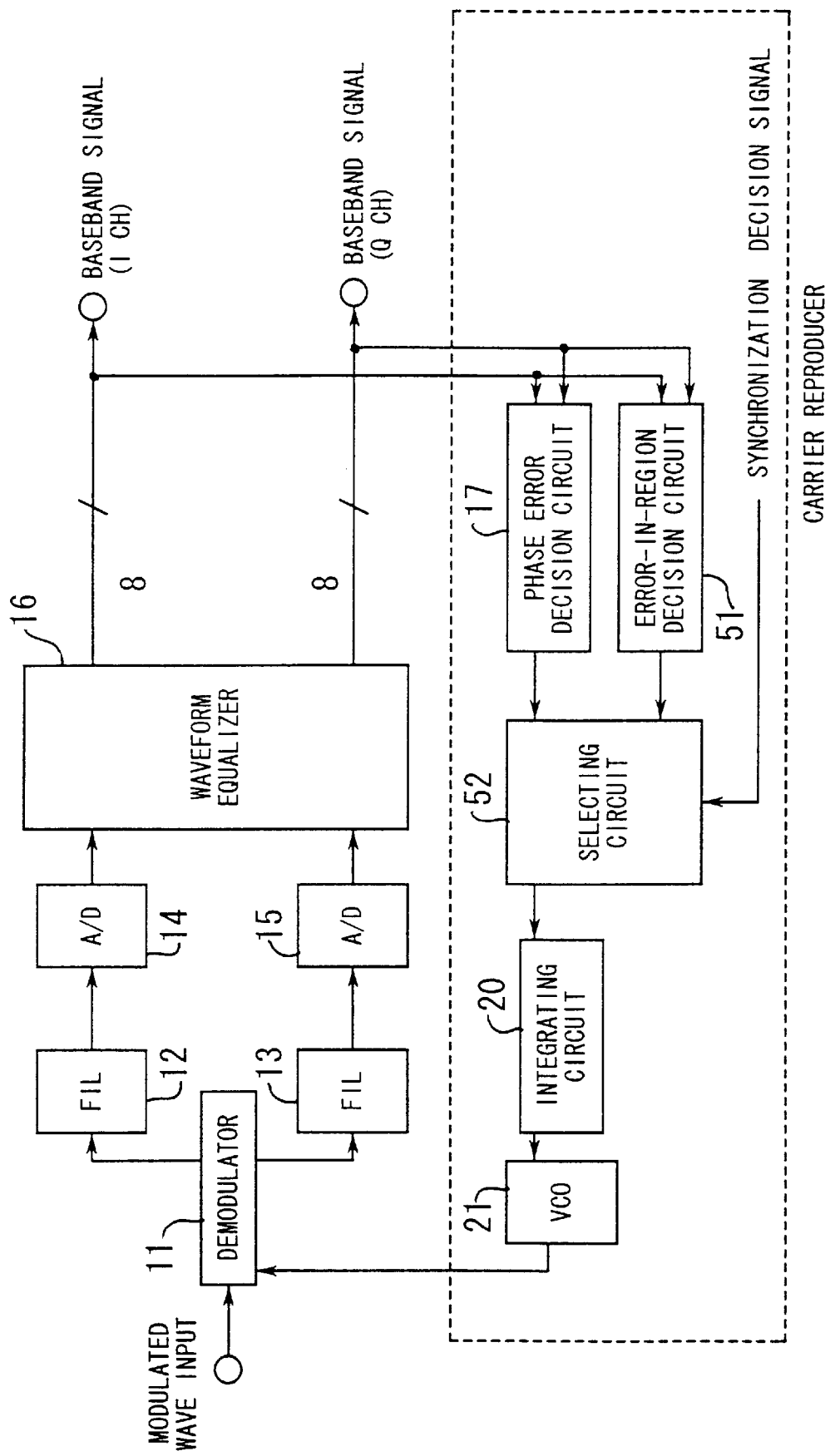
FIG. 12 is a block diagram of a carrier reproducing circuit according to a third embodiment of the present invention.

FIG. 12 shows in detailed block form a carrier reproducing circuit according to a third embodiment of the present invention. Those parts shown in FIG. 12 which are identical to those shown in FIG. 16 are denoted by identical reference numerals, and will not be described later on. According to the third embodiment, the carrier reproducing circuit will be described with respect to a pattern of locations of 128QAM signal points.

Figure 13:
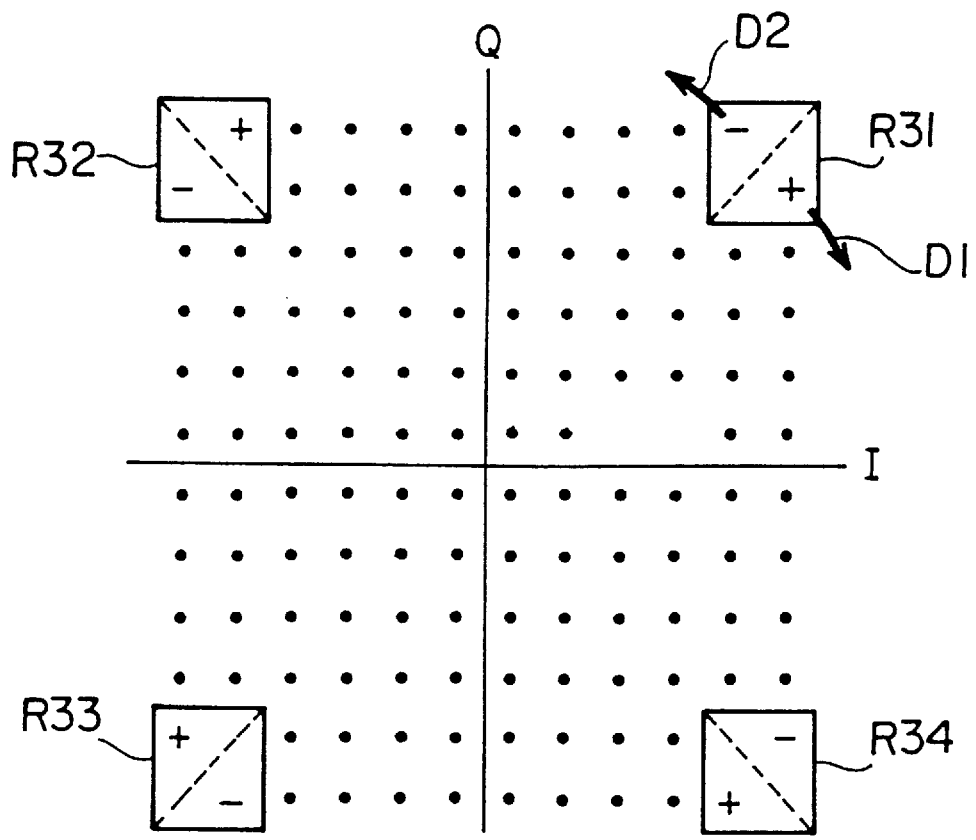
FIG. 13 is a constellation diagram showing a third region.

In the third embodiment, an error-in-region decision circuit 51 decides whether an inputted baseband signal is present in a leading phase region (+ region) or a lagging phase region (- region) of a third region. As shown in FIG. 13, the third region comprises small square segments R31~R34 in the respective quadrants, which are devoid of normal signal points if they are arranged in a square pattern. Each of the small square segments R31~R34 is divided into triangular portions by a straight line passing through the origin of the phase-amplitude signal space. Those portions which are represented by "+" in FIG. 13 are referred to as leading phase regions (+ regions), and those portions which are represented by "−" in FIG. 13 are referred to as lagging phase regions (− regions).

Figures 14A, 14B:
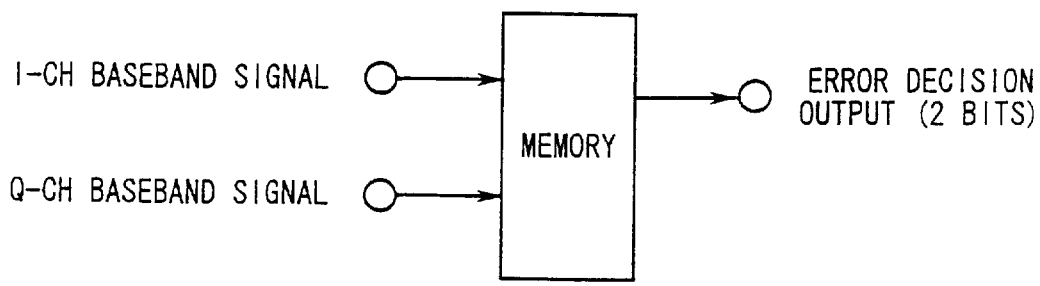
FIG. 14(A) is a block diagram of an internal structure of an error-in-region decision circuit in the carrier reproducing circuit shown in FIG. 12.
FIG. 14(B) is a diagram illustrating how the error-in-region decision circuit shown in FIG. 14(A) operates.

FIG. 14 (A) shows in block form an internal structure of the error-in-region decision circuit 51. As shown in FIG. 14(A), the error-in-region decision circuit 51 comprises a memory 51a which outputs a 2-bit error decision output signal to a selecting circuit 52 (see FIG. 12) based on the I- and Q-channel baseband signals. Specifically, as shown in FIG. 14(B), the error-in-region decision circuit 51 outputs an error decision output signal "10" if the inputted baseband signal is present in a leading phase region (+ region), an error decision output signal "01" if the inputted baseband signal is present in a lagging phase region (− region), and an error decision output signal "10" or "01" which has been outputted in a preceding cycle if the inputted baseband signal is not present in the third region.

Figure 15:
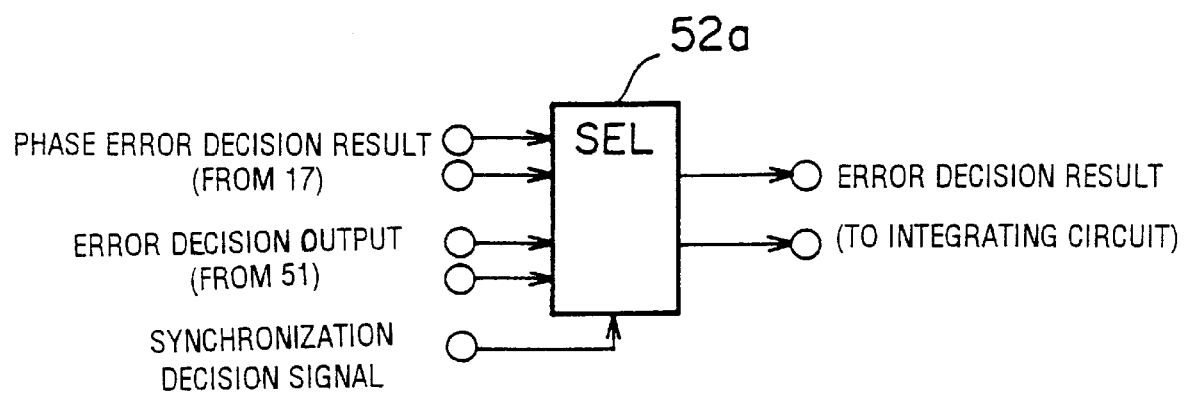
FIG. 15 is a block diagram of an internal structure of a selecting circuit in the carrier reproducing circuit shown in FIG. 12.

FIG. 15 shows in block form an internal structure of the selecting circuit 52. As shown in FIG. 15, the selecting circuit 52 comprises a selector 52a having input terminals for being supplied with a phase error decision signal from the phase error decision circuit 17 and other input terminals for being supplied with an error decision output signal from the error-in-region decision circuit 51. Based on a synchronization decision signal, the selector 52a selects the phase error decision signal from the phase error decision circuit 17 and outputs the phase error decision signal to the integrating circuit 20 when the baseband signal is in phase, and selects the error decision output signal from the error-in-region decision circuit 51 and outputs the error decision output signal to the integrating circuit 20 when the baseband signal is out of phase. Consequently, when an inputted baseband signal is out of phase, if the baseband signal is present in a leading phase region (+ region), then the integrating circuit 20 generates a control signal to rotate the baseband signal in a phase lagging direction D1 (see FIG. 13), and if the baseband signal is present in a lagging phase region (− region), then the integrating circuit 20 generates a control signal to rotate the baseband signal in a phase leading direction D2 (see FIG. 13). Furthermore, when an inputted baseband signal is out of phase, if the baseband signal is not present in the third region, then the integrating circuit 20 generates the same control signal as the preceding control signal. Therefore, when an inputted baseband signal is out of phase, the baseband signal is forcibly rotated in the phase lagging direction D1 or the phase leading direction D2, and hence brought into phase.

The carrier reproducing circuits according to the first and second embodiments are relatively complex in circuit arrangement, and takes time to synchronize a baseband signal because it is necessary to monitor the baseband signal over a certain period of time to ascertain whether the baseband signal is present in the second region. However, the carrier reproducing circuit according to the third embodiment is relatively simple in circuit arrangement, and needs no baseband signal monitoring over a certain period of time.

The carrier reproducing circuit according to the third embodiment has been described with respect to the pattern of locations of 128QAM signal points. However, the principles of the third embodiment are also applicable to other QAM systems than the 128QAM system, in which normal signal points are located in a non-square pattern in a phase-amplitude signal space.

With the present invention, as described above, there are established in a phase-amplitude signal space a first region composed of eight small regions defined around eight signal points, farthest from the center of the phase-amplitude signal space, and a second region composed of four small regions defined across the axes of the phase-amplitude signal space outside of the normal signal points. When a baseband signal is out of phase, if the baseband signal is present in the first region and the baseband signal is not present in the second region over a predetermined period of time around the time at which the baseband signal is present in the first region, then a control signal is generated based on a phase error with respect to the baseband signal present in the first region, and if the baseband signal is present in the first region and the baseband signal is present in the second region over the predetermined period of time, then a control signal is generated based on a preceding phase error.

Consequently, it is possible to make a phase error decision when an inputted baseband signal is out of phase and to bring the baseband signal into phase even in a QAM system in which normal signal points are located in a non-square pattern in a phase-amplitude signal space and no signal points are present in four corners of the phase-amplitude signal space.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A carrier reproducing circuit for a multi-valued quadrature amplitude modulation system in which normal signal points are located in a non-square pattern in a phase-amplitude signal space, comprising:

carrier outputting means for outputting a carrier which has a frequency and phase depending on a control signal;

quadrature demodulating means for quadrature-demodulating an inputted signal with said carrier and outputting a baseband signal;

phase error detecting means for detecting a phase error between the position of the baseband signal in a phase-amplitude signal space and the position of a corresponding one of a plurality of predetermined normal signal points in the phase-amplitude signal space;

control signal generating means for generating the control signal in order to reduce the phase error based on said phase error;

first region deciding means for detecting a presence of the baseband signal, when out of phase, in a first region composed of eight small regions defined around eight signal points, farthest from the center of the phase-amplitude signal space, and outputting a first signal;

second region deciding means for detecting a presence of the baseband signal, when out of phase, in a second region composed of four small regions defined across the axes of the phase-amplitude signal space outside of the normal signal points, and outputting a second signal; and selective outputting means for outputting a phase error detected by said phase error detecting means with respect to the baseband signal at the time said first signal is outputted, to said control signal generating means, if said second signal is not outputted over a predetermined period of time around the time at which said first signal is outputted, and outputting a phase error detected by said phase error detecting means with respect to the baseband signal at the time said first signal is outputted in a preceding cycle, to said control signal generating means, if said second signal is outputted in said predetermined period of time.

2. A carrier reproducing circuit according to claim 1, further comprising:

delaying means for delaying the baseband signal which has been quadrature-demodulated;

said first region deciding means comprising means for detecting a presence of the baseband signal in said first region and outputting said first signal based on the baseband signal delayed by said delaying means;

said second region deciding means comprising means for detecting a presence of the baseband signal in said second region and outputting said second signal based on the baseband signal delayed by said delaying means;

said selective outputting means comprising means for outputting the phase error detected by said phase error detecting means with respect to the baseband signal at the time said first signal is outputted, to said control signal generating means, if said second signal is not outputted due to a predetermined number of baseband signals with respect to said predetermined number of baseband signals inputted around the baseband signal for which said first signal is outputted, and outputting the phase error detected by said phase error detecting means with respect to the baseband signal at the time said first signal is outputted in the preceding cycle, to said control signal generating means, if said second signal is outputted due to said predetermined number of baseband signals.

3. A carrier reproducing circuit according to claim 1, further comprising:

a first shift register for shifting the second signal outputted from said second region deciding means each time a baseband signal is inputted and holding the shifted second signal at a predetermined number of stages thereof; and ORing means for ORing signals held in the stages of said first shift register;

said selective outputting means comprising:

first selecting means for outputting the phase error detected by said phase error detecting means with respect to the baseband signal at the time said first signal is outputted, if said first signal is outputted, and outputting the phase error detected by said phase error detecting means with respect to the baseband signal at the time said first signal is outputted in the preceding cycle, if said first signal is not outputted;

a second shift register for shifting an output signal from said first selecting means each time a baseband signal is inputted and holding the shifted output signal at half as many as said predetermined number of stages; and second selecting means for outputting an output signal from a final stage of said second shift register to said control signal generating means if a signal corresponding to said second signal is not outputted from said ORing means, and outputting the phase error detected by said phase error detecting means with respect to the baseband signal at the time said first signal is outputted in the preceding cycle, if a signal corresponding to said second signal is outputted from said ORing means.

4. A carrier reproducing circuit for a multi-valued quadrature amplitude modulation system in which normal signal points are located in a non-square pattern in a phase-amplitude signal space, comprising:

carrier outputting means for outputting a carrier which has a frequency and phase depending on a control signal;

quadrature demodulating means for quadrature-demodulating an inputted signal with said carrier and outputting a baseband signal;

phase error detecting means for detecting a phase error between the position of the baseband signal in a phase-amplitude signal space and the position of a corresponding one of a plurality of predetermined normal signal points in the phase-amplitude signal space, outputting a first signal if said baseband signal is leading the corresponding normal signal point in phase, and outputting a second signal if said baseband signal is lagging the corresponding normal signal point in phase;

control signal generating means for generating a control signal to delay said carrier in phase when said first input signal is inputted thereto, and generating a control signal to advance said carrier in phase when said second input signal is inputted thereto;

said non-square pattern being devoid of small square segments in respective quadrants thereof, each of said small square segments being divided into a leading phase region and a lagging phase region by a straight line passing through the origin of the phase-amplitude signal space;

region deciding means for detecting a presence of the baseband signal in said leading phase region and outputting said second signal when the baseband signal is out of phase, and detecting a presence of the baseband signal in said lagging phase region and outputting said first signal when the baseband signal is out of phase; and selective outputting means for causing said control signal generating means to output an output signal from said phase error detecting means when the baseband signal is in phase, and causing said control signal generating means to output an output signal from said region deciding means when the baseband signal is out of phase.

* * * * *